United States Patent
Wu et al.

(10) Patent No.: US 9,013,537 B2
(45) Date of Patent: Apr. 21, 2015

(54) METHOD, DEVICE, AND NETWORK SYSTEMS FOR CONTROLLING MULTIPLE AUXILIARY STREAMS

(71) Applicant: Huawei Device Co., Ltd., Shenzhen (CN)

(72) Inventors: Jiaoli Wu, Shenzhen (CN); Shuzhao Liao, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 100 days.

(21) Appl. No.: 13/910,341

(22) Filed: Jun. 5, 2013

(65) Prior Publication Data

US 2013/0265380 A1    Oct. 10, 2013

Related U.S. Application Data

(63) Continuation of application No. PCT/CN2011/083542, filed on Dec. 6, 2011.

(30) Foreign Application Priority Data

Dec. 7, 2010   (CN) .......................... 2010 1 0577099

(51) Int. Cl.
*H04N 7/15*     (2006.01)
*H04L 12/18*    (2006.01)
*H04L 29/06*    (2006.01)

(52) U.S. Cl.
CPC .............. *H04N 7/15* (2013.01); *H04L 12/1813* (2013.01); *H04L 12/1827* (2013.01);
(Continued)

(58) Field of Classification Search
CPC ............ H04L 12/1813; H04L 12/1827; H04L 65/1069; H04L 65/4015; H04L 65/4038; H04N 7/15

USPC ................... 348/14.01–14.16; 370/260–261; 709/204
See application file for complete search history.

(56) References Cited

U.S. PATENT DOCUMENTS

2008/0095079 A1*   4/2008   Barkley et al. ................ 370/260
2010/0250679 A1    9/2010   Wang
(Continued)

FOREIGN PATENT DOCUMENTS

CN        101094382 A    12/2007
CN        101115183 A    1/2008
(Continued)

OTHER PUBLICATIONS

Foreign Communication From a Counterpart Application, PCT/CN2011/083542, English Translation of Written Opinion dated Mar. 15, 2012, 11 pages.
Foreign communication from a counterpart application, PCT application PCT/CN2011/083542, International Search Report dated Mar. 15, 2012, 3 pages.
(Continued)

*Primary Examiner* — Melur Ramakrishnaiah
(74) *Attorney, Agent, or Firm* — Conley Rose, P.C.; Grant Rodolph; Nicholas K. Beaulieu

(57) ABSTRACT

A method, a device, and a network system for controlling multiple auxiliary streams are disclosed. The method for controlling multiple auxiliary streams includes: applying, by a terminal at a first site, for a presentation (PRE) token; and sending, by the terminal at the first site after applying for and obtaining the PRE token, an auxiliary stream to a terminal at a second site through a PRE auxiliary stream channel corresponding to the PRE token, and sending one or more other auxiliary streams to the terminal at the second site through an auxiliary stream channel bound with the PRE auxiliary stream channel. By using the technical solutions provided in the embodiments of the present invention, participants at the sites can view images of multiple auxiliary streams simultaneously.

14 Claims, 9 Drawing Sheets

(52) U.S. Cl.
CPC ......... *H04L 65/403* (2013.01); *H04L 65/1069* (2013.01); *H04L 65/4015* (2013.01); *H04L 65/4038* (2013.01); *H04L 65/4053* (2013.01)

(56) References Cited

U.S. PATENT DOCUMENTS

| | | |
|---|---|---|
| 2011/0055893 A1 | 3/2011 | Walls et al. |
| 2011/0096699 A1 | 4/2011 | Sakhamuri et al. |
| 2011/0099227 A1 | 4/2011 | Walls et al. |
| 2011/0099485 A1 | 4/2011 | Alcorn et al. |
| 2012/0263286 A1* | 10/2012 | Liao et al. ............... 379/202.01 |

FOREIGN PATENT DOCUMENTS

| | | |
|---|---|---|
| CN | 101242513 A | 8/2008 |
| CN | 101459816 A | 6/2009 |
| CN | 101635822 A | 1/2010 |
| CN | 101753329 A | 6/2010 |
| WO | 2011087515 A1 | 7/2011 |

OTHER PUBLICATIONS

"Series H: Audiovisual and Multimedia Systems Infrastructure of Audiovisual Services—Systems Aspects—Rule Management and Additional Media Channels for H.300-Series Terminals," ITU-T Recommendation H.239, Sep. 2005, 32 pages.

"Series H: Audiovisual and Multimedia Systems Infrastructure of Audiovisual Services—Systems Aspects, Role Management and Additional Media Channels for H.300-Series Terminals," ITU-T, Telecommunication Standardization Sector of ITU, H.239, Sep. 13, 2005, 30 pages.

Foreign Communication From a Counterpart Application, Chinese Application No. 201010577099.3, Chinese Office Action dated Jul. 23, 2013, 4 pages.

Foreign Communication From a Counterpart Application, Chinese Application No. 201010577099.3, Partial English Translation of Chinese Office Action dated Jul. 23, 2013, 5 pages.

Foreign Communication From a Counterpart Application, Chinese Application No. 201010577099.3, Chinese Search Report dated Jul. 10, 2013, 2 pages.

* cited by examiner

METHOD, DEVICE, AND NETWORK SYSTEMS FOR CONTROLLING MULTIPLE AUXILIARY STREAMS

CROSS-REFERENCE TO RELATED APPLICATIONS

This application is a continuation of International Application No. PCT/CN2011/083542, filed on Dec. 6, 2011, which claims priority to Chinese Patent Application No. 201010577099.3, filed on Dec. 7, 2010, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a method, device, and network system for controlling multiple auxiliary streams.

BACKGROUND

A video conferencing service is a multimedia communication service. It uses video conferencing terminals and communication networks to have a conference and can implement the exchange of images, speech, and data between two sites or among multiple sites simultaneously. A terminal at a site compresses and encodes signals of images shot by a local camera and voice signals of participants that are collected by a microphone in a participant area, and transmits the signals to a remote site via a transmission network. At the same time, the terminal receives digital signals transmitted from the remote site via the transmission network, and decodes the digital signals to obtain images and signals of a participant at the remote site. With the development of video conferencing, the site has developed, from a site including one camera, one monitor, and one participant area in the past, to a site including multiple cameras, multiple monitors, and multiple participant areas. The multiple cameras, multiple monitors, and multiple participant areas at the same site are associated in a physical or logical relationship.

In a video conference, because discussion regarding conference content is required sometimes, a conference content image needs to be displayed on the monitor of a site. As shown in FIG. 1, site A sends a conference content image to terminals of remote sites B and C through auxiliary stream channels, and the terminals of site B and site C display the conference content image on local monitors upon reception. The prior art provides an auxiliary stream transmission mode based on a token. Specifically, one conference has only one auxiliary stream token, and a site obtaining the token sends an auxiliary stream, and participants at all the sites watch an auxiliary stream image of the site having the token.

The prior art has the following disadvantage:

In some video conferences, users may require watching the projection of objects and the conference content image simultaneously. In this case, two auxiliary streams are required, one for transmitting an object projection image, and the other for transmitting the conference content image. However, in the prior art, one conference has only one auxiliary stream token, and the auxiliary stream token can be bound with only one auxiliary stream, so the participants at the sites cannot view the object projection and the conference content image simultaneously.

SUMMARY

Embodiments of the present invention provide a method, device, and network system for controlling multiple auxiliary streams, so that participants at sites can view images of multiple auxiliary streams simultaneously.

For this reason, embodiments of the present invention provide:

A method for controlling multiple auxiliary streams, including: applying, by a terminal at a first site, for a presentation (PRE) token; and sending, by the terminal at the first site after applying for and obtaining the PRE token, an auxiliary stream to a terminal at a second site through a PRE auxiliary stream channel corresponding to the PRE token, and sending one or more other auxiliary streams to the terminal at the second site through an auxiliary stream channel bound with the PRE auxiliary stream channel.

A method for controlling multiple auxiliary streams, including: sending, by multiple terminals at a same site, auxiliary streams through their respective auxiliary stream channels after the site applies for and obtains a PRE token, so that terminals that are paired with the terminals sending the auxiliary streams and are located at one or more other sites of a conference receive respective auxiliary streams.

A terminal, located at a first site, including: a token applying unit configured to apply for a PRE token; and an auxiliary stream sending unit configured to send, after applying for and obtaining the PRE token, an auxiliary stream to a terminal at a second site through a PRE auxiliary stream channel corresponding to the PRE token, and send one or more other auxiliary streams to the terminal at the second site through an auxiliary stream channel bound with the PRE auxiliary stream channel.

A network system, including: a first terminal and a second terminal, where the first terminal and the second terminal are located at a first site, where: the first terminal is configured to send an auxiliary stream through a first auxiliary stream channel after the first site applies for and obtains a PRE token, so that a terminal paired with the first terminal and is located at a second site receives the auxiliary stream; and the second terminal is configured to send another auxiliary stream through a second auxiliary stream channel after the first site applies for and obtains the PRE token, so that a terminal that is paired with the second terminal and is located at the second site receives the other auxiliary stream.

In the embodiments of the present invention, after obtaining the PRE token, the first site can send multiple auxiliary streams through the PRE auxiliary stream channel corresponding to the PRE token and the auxiliary stream channel bound with the PRE auxiliary stream channel, so that participants at one or more other sites can view the images of the multiple auxiliary streams simultaneously after receiving the multiple auxiliary streams; or, after obtaining the PRE token, multiple terminals at the site send auxiliary streams, so that terminals that are paired with the terminals sending the auxiliary streams that are located at one or more other sites receive respective auxiliary streams and that participants at one or more other sites can view the images of the multiple auxiliary streams simultaneously.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION

Figure 1:
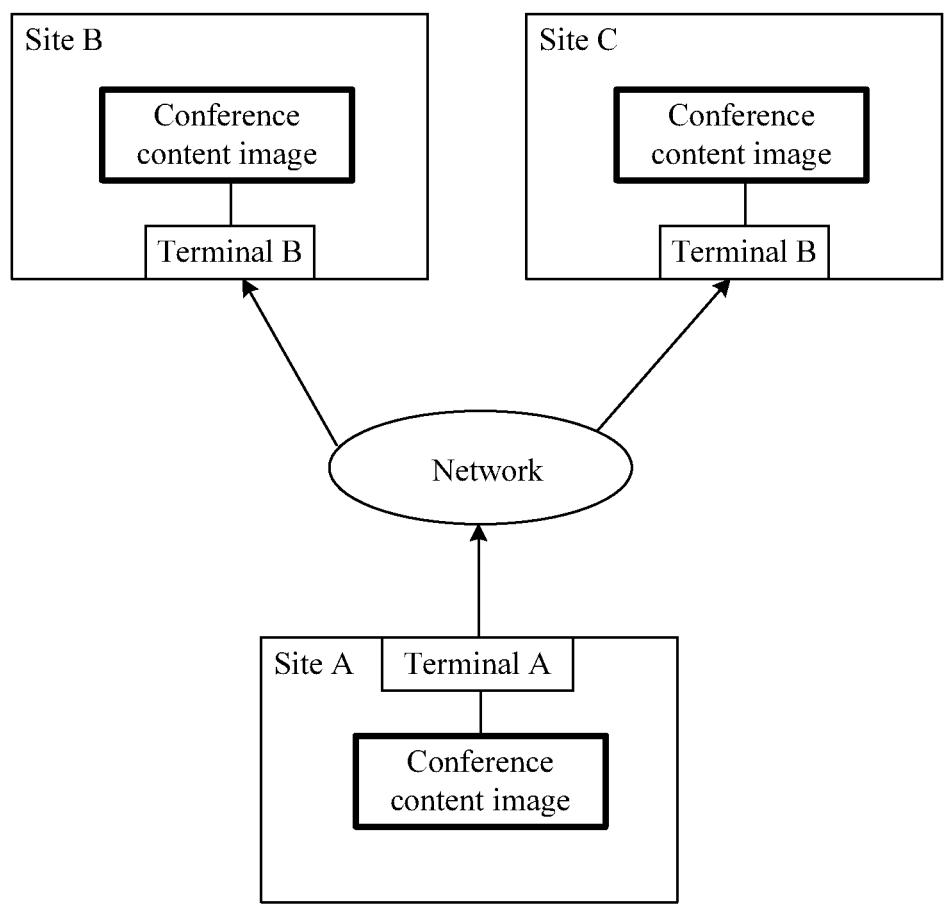
FIG. 1 is a schematic diagram of multiple sites displaying a conference content image according to the prior art.
Figure 2:
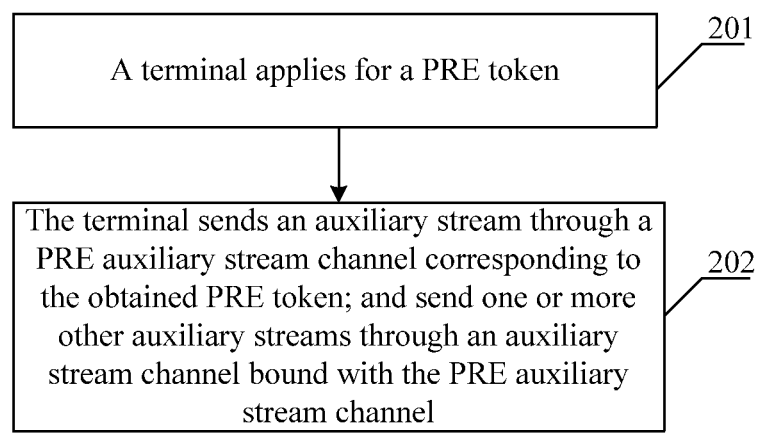
FIG. 2 is a flow chart of a method for controlling multiple auxiliary streams according to an embodiment of the present invention.

Referring to FIG. 2, an embodiment of the present invention provides a method for controlling multiple auxiliary streams. The method includes the following:

201. A terminal at a first site applies for a PRE token.

202. The terminal at the first site sends an auxiliary stream to a terminal at a second site through a PRE auxiliary stream channel corresponding to the obtained PRE token, and sends one or more other auxiliary streams to the terminal at the second site through an auxiliary stream channel bound with the PRE auxiliary stream channel.

The auxiliary stream channel bound with the PRE auxiliary stream channel is a PREAnnex auxiliary stream channel extended in present invention, or, the auxiliary stream channel bound with the PRE auxiliary stream channel is a LIVE auxiliary stream channel.

The PRE auxiliary stream channel is a common channel for transmitting an auxiliary stream, and the terminal obtaining the PRE token may transmit an auxiliary stream through the PRE auxiliary stream channel.

The PREAnnex auxiliary stream channel is an auxiliary stream channel extended in this application, and the PREAnnex auxiliary stream channel transmits an auxiliary stream by following the PRE auxiliary stream channel. In this embodiment and the embodiments shown in FIGS. 3 and 4, the PREAnnex auxiliary stream channel is used to send the auxiliary stream to the terminal to which the PRE auxiliary stream channel is used to send an auxiliary stream, that is, the PRE auxiliary stream channel and the PREAnnex auxiliary stream channel are used to send multiple auxiliary streams to the same terminal.

The LIVE auxiliary stream channel in the prior art is used by following main streams, where the main streams may be images of participants in a conference. Assuming that site B sends the main streams to site A, site B may also send auxiliary streams to site A through the LIVE auxiliary stream channel. However, in this embodiment and the embodiments shown in FIGS. 3 and 4, the LIVE auxiliary stream channel is bound with the PRE auxiliary stream channel corresponding to the PRE token, that is, the LIVE auxiliary stream channel follows the PRE auxiliary stream channel, and the LIVE auxiliary stream channel is used to send an auxiliary stream to the terminal to which the PRE auxiliary stream channel is used to send an auxiliary stream, that is, the PRE auxiliary stream channel and the LIVE auxiliary stream channel are used to send multiple auxiliary streams to the same terminal at the same site.

Specifically, when both the terminal at the first site and the terminal at the second site support the PRE auxiliary stream channel and the auxiliary stream channel bound with the PRE auxiliary stream channel, and the type of the PRE auxiliary stream channel is the same as that of the auxiliary stream channel bound with the PRE auxiliary stream channel, the terminal at the first site sends an auxiliary stream to the terminal at the second site through the PRE auxiliary stream channel, and sends one or more other auxiliary streams to the terminal at the second site through the auxiliary stream channel bound with the PRE auxiliary stream channel; specifically, when both the terminal at the first site and the terminal at the second site support the PRE auxiliary stream channel and an auxiliary content PREAnnex auxiliary stream channel bound with the PRE auxiliary stream channel, an auxiliary stream is sent to the terminal at the second site through the PRE auxiliary stream channel, and one or more other auxiliary streams are sent to the terminal at the second site through the PREAnnex auxiliary stream channel bound with the PRE auxiliary stream channel; or, when both the terminal at the first site and the terminal at the second site support the PRE auxiliary stream channel and a LIVE auxiliary stream channel bound with the PRE auxiliary stream channel, an auxiliary stream is sent to the terminal at the second site through the PRE auxiliary stream channel, and one or more other auxiliary streams are sent to the terminal at the second site through the LIVE auxiliary stream channel bound with the PRE auxiliary stream channel.

Or, when both the terminal at the first site and the terminal at the second site support the PRE auxiliary stream channel, the terminal at the first site may determine, according to a predetermined rule, that the terminal at the first site and the terminal at the second site also support the PREAnnex auxiliary stream channel bound with the PRE auxiliary stream channel. An auxiliary stream is sent to the terminal at the second site through the PRE auxiliary stream channel, and one or more other auxiliary streams are sent to the terminal at the second site through the PREAnnex auxiliary stream channel bound with the PRE auxiliary stream channel, where the predetermined rule may specify that, if a terminal supports the PRE auxiliary stream channel, the terminal supports the PREAnnex auxiliary stream channel.

A binding relationship between the PRE auxiliary stream channel and the LIVE auxiliary stream channel may also be preset on the terminals at the sites; or, by default, the PRE auxiliary stream channel corresponding to the PRE token has a default binding relationship with multiple LIVE auxiliary stream channels, that is, as long as the PRE auxiliary stream channel corresponding to the PRE token is opened and is used for transmitting an auxiliary stream, each of the multiple LIVE auxiliary stream channels is also used for transmitting an auxiliary stream, and each of the multiple LIVE auxiliary stream channels follows the PRE auxiliary stream channel, having a same destination site as the PRE auxiliary stream channel. Or, before this step, binding relationship indication information is sent to the destination site, where the binding relationship indication information indicates the LIVE auxiliary stream channel bound with the PRE auxiliary stream channel; or, binding relationship indication information is sent to a conferencing server, where the binding relationship indication information indicates the LIVE auxiliary stream channel bound with the PRE auxiliary stream channel, so that the conferencing server sends the multiple auxiliary streams to a site other than the first site through the PRE auxiliary stream channel and the LIVE auxiliary stream channel bound with the PRE auxiliary stream channel after receiving the multiple auxiliary streams sent by the terminal.

Specifically, in a point-to-point conference, the terminal at the first site directly sends an auxiliary stream to the terminal at the second site through the PRE auxiliary stream channel corresponding to the PRE token, and directly sends one or more other auxiliary streams to the terminal at the second site through the auxiliary stream channel bound with the PRE auxiliary stream channel. In a multipoint conference, the terminal at the first site sends an auxiliary stream to the conferencing server through the PRE auxiliary stream channel corresponding to the PRE token, and sends one or more other auxiliary streams to the conferencing server through the auxiliary stream channel bound with the PRE auxiliary stream channel, so that the conferencing server sends the auxiliary stream and one or more other auxiliary streams to a terminal at a site other than the first site in the conference. The conferencing server may be a multipoint control unit (MCU) integrated signaling and media processing, or may include two devices that process control signaling and media, respectively.

In this embodiment of the present invention, after obtaining the PRE token, the first site can send multiple auxiliary streams to the terminal at the second site through the PRE auxiliary stream channel corresponding to the PRE token and the auxiliary stream channel bound with the PRE auxiliary stream channel, so that participants at the second site can view images of multiple auxiliary streams simultaneously.

The technical solution provided in the above embodiment is described in detail in the following two embodiments.

Figure 3:
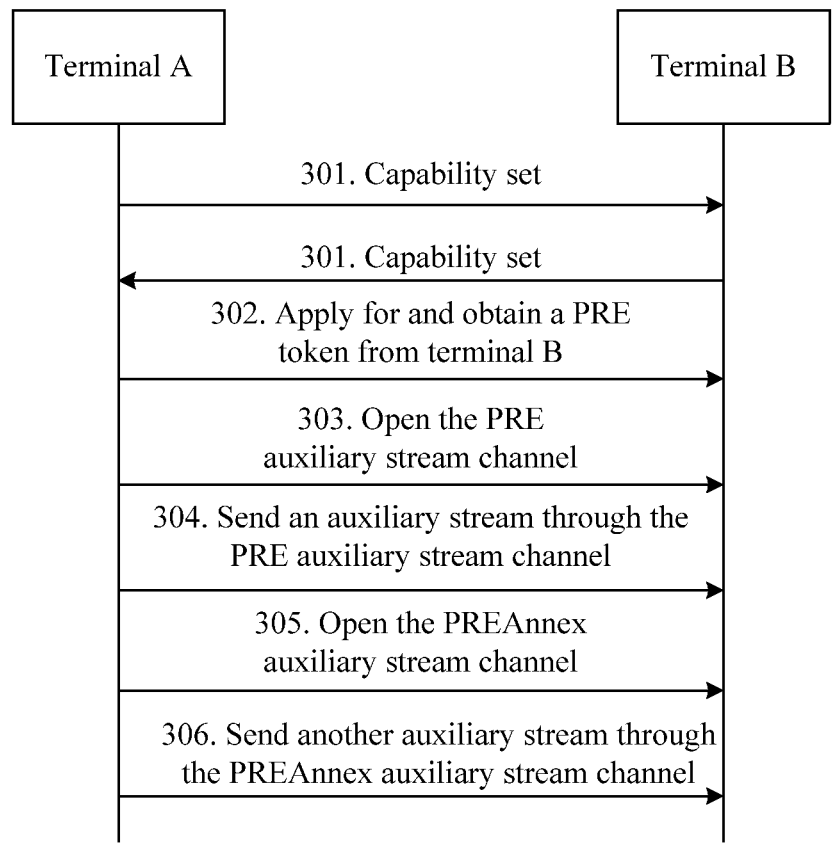
FIG. 3 is a flow chart of a method for sending multiple auxiliary streams by a same terminal according to an embodiment of the present invention.

FIG. 3 shows a method for controlling auxiliary streams according to an embodiment of the present invention. In this method, a new auxiliary stream PREAnnex is extended, and multiple auxiliary streams are sent through the extended auxiliary stream channel and a PRE auxiliary stream channel. The method specifically includes the following:

301. Terminal A sends a capability set of terminal A to terminal B, and terminal B sends a capability set of terminal B to terminal A.

Terminal A and terminal B are located at different sites, and the capability sets carry auxiliary stream channel types supportable by the terminals, that is, a PRE auxiliary stream channel and/or a PREAnnex auxiliary stream channel.

302. Terminal A applies for and obtains a PRE token.

Specifically, terminal A may send a token obtaining request to a terminal having the token in a current conference, to obtain the token from the terminal having the token in the current conference.

303. Terminal A opens the PRE auxiliary stream channel between terminal A and terminal B when determining, according to the capability set of terminal B and the capability set of terminal A, that both terminal A and terminal B can transmit auxiliary streams through the PRE auxiliary stream channel.

304. Terminal A sends an auxiliary stream to terminal B through the PRE channel.

305. If terminal A needs to send another auxiliary stream, terminal A opens the PREAnnex auxiliary stream channel between terminal A and terminal B when determining, according to the capability set of terminal B and the capability set of terminal A, that terminal A and terminal B can transmit auxiliary streams through the PREAnnex auxiliary stream channel bound with the PRE auxiliary stream channel.

306. Terminal A sends another auxiliary stream to terminal B through the PREAnnex auxiliary stream channel.

Subsequently, if terminal A does not need to send another auxiliary stream, the PREAnnex auxiliary stream channel may be closed.

It should be noted that, this embodiment is described by using an example of a point-to-point conference. For a multipoint conference, the difference from the above example lies in that, each terminal directly exchanges the capability sets with the conferencing server. After terminal A applies for and obtains the PRE token, and opens the PRE auxiliary stream channel and PREAnnex auxiliary stream channel between terminal A and the conferencing server, after determining terminals supporting the PRE auxiliary stream channel and the PREAnnex auxiliary stream channel according to capability sets of terminals at one or more other sites, the conferencing server opens the PRE auxiliary stream channel and PREAnnex auxiliary stream channel between the conferencing server and the terminals at one or more other sites, and then broadcasts, through the PRE auxiliary stream channel and PREAnnex auxiliary stream channel between the conferencing server and each terminal at one or more other sites, the two auxiliary streams received from terminal A to the terminals at one or more other sites in the conference.

It should be noted that, negotiation about capabilities of supporting the PREAnnex auxiliary stream channel may not be performed between terminals, that is, the capability set in step 301 does not involve information of the PREAnnex auxiliary stream channel, and whether to open the PREAnnex auxiliary stream channel is determined according to a predetermined rule, for example, the rule specifies that the terminal's support of the PRE auxiliary stream channel indicates that the PREAnnex auxiliary stream channel is supported, so the PREAnnex auxiliary stream channel may be opened as long as the peer supports the PRE auxiliary stream channel. Specifically, the predetermined rule may also specify information such as a format of an auxiliary stream sent through the PREAnnex auxiliary stream channel, a used protocol, and a port number of the PREAnnex auxiliary stream channel at an auxiliary stream receiving end.

In this embodiment of the present invention, after obtaining the PRE token, terminal A can send the multiple auxiliary streams to terminal B through the PRE auxiliary stream channel corresponding to the PRE token and the PREAnnex auxiliary stream channel bound with the PRE auxiliary stream channel, so that participants at the site where terminal B is located can view the images of multiple auxiliary streams.

Figure 4:
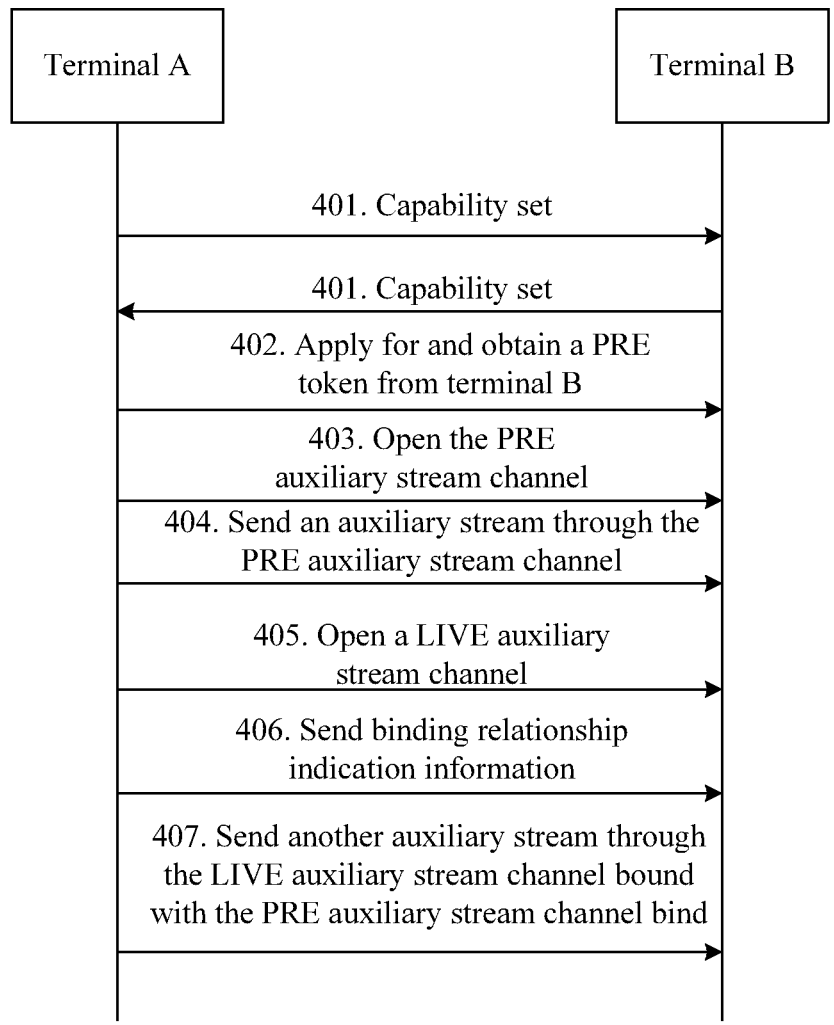
FIG. 4 is a flow chart of another method for sending multiple auxiliary streams by a same terminal according to an embodiment of the present invention.

FIG. 4 shows a method for controlling auxiliary streams according to an embodiment of the present invention. In this method, multiple auxiliary streams are sent through a PRE auxiliary stream channel and a LIVE auxiliary stream channel. The method specifically includes the following:

401. Terminal A sends a capability set of terminal A to terminal B, and terminal B sends a capability set of terminal B to terminal A.

Terminal A and terminal B are located at different sites, and the capability sets carry auxiliary stream channel types supportable by the terminals, that is, the PRE auxiliary stream channel and/or the LIVE auxiliary stream channel.

402. Terminal A applies for and obtains a PRE token.

403. Terminal A opens the PRE auxiliary stream channel between terminal A and terminal B when determining, according to the capability set of terminal B and the capability set of terminal A, that both terminal A and terminal B can use the PRE auxiliary stream channel.

404. Terminal A sends an auxiliary stream to terminal B through the PRE auxiliary stream channel.

405. If terminal A needs to send another auxiliary stream, terminal A opens one or more LIVE auxiliary stream channels between terminal A and terminal B when determining, according to the capability set of terminal B and the capability set of terminal A, that both terminal B and terminal A can use the LIVE auxiliary stream channel.

It should be noted that, the LIVE auxiliary stream channel in step 405 may be opened before the PRE auxiliary stream channel is opened, or may be opened after the PRE auxiliary stream channel is opened, which does not affect the implementation of the present invention.

406. Terminal A sends binding relationship indication information to terminal B, where the binding relationship indication information indicates the LIVE auxiliary stream channel bound with the PRE auxiliary stream channel, that is, indicates which LIVE auxiliary stream channel is bound with the PRE auxiliary stream channel.

Specifically, the binding relationship indication information may be sent through private signaling.

This step may be, sending the binding relationship indication information when another auxiliary stream or several auxiliary streams need to be sent through the opened auxiliary stream channel.

407. Terminal A sends another auxiliary stream to terminal B through the LIVE auxiliary stream channel bound with the PRE auxiliary stream channel.

Step 406 is an optional step, that is, the binding relationship indication information may also not be sent to terminal B, and it may be considered that all LIVE auxiliary stream channels are bound with the PRE auxiliary stream channel.

It should be noted that, this embodiment is described by using an example of a point-to-point conference. For a multipoint conference, the difference from the above example lies in that, each terminal directly exchanges the capability sets with the conferencing server. After terminal A applies for and obtains the PRE token, and opens the PRE auxiliary stream channel and LIVE auxiliary stream channel between terminal A and the conferencing server, after determining terminals supporting the PRE auxiliary stream channel and the LIVE auxiliary stream channel according to capability sets of terminals at one or more other sites, the conferencing server opens the PRE auxiliary stream channel and LIVE auxiliary stream channel between the conferencing server and the terminals at one or more other sites, and then broadcasts, through the PRE auxiliary stream channel and LIVE auxiliary stream channel between the conferencing server and the terminals at one or more other sites, the two auxiliary streams received from terminal A to the terminals in the conference.

In this embodiment of the present invention, after obtaining the PRE token, terminal A can send multiple auxiliary streams to terminal B through the PRE auxiliary stream channel corresponding to the PRE token and the LIVE auxiliary stream channel bound with the PRE auxiliary stream channel, so that participants at the site where terminal B is located can view images of multiple auxiliary streams.

Figure 5:
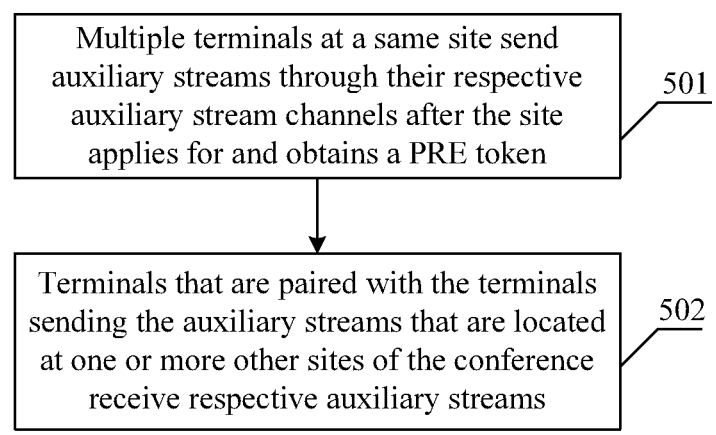
FIG. 5 is a flow chart of another method for controlling multiple auxiliary streams according to an embodiment of the present invention.

Referring to FIG. 5, an embodiment of the present invention provides a method for controlling multiple auxiliary streams, and in this method, different terminals at a same site send auxiliary streams. The method specifically includes the following:

501. Multiple terminals at a same site send auxiliary streams through their respective auxiliary stream channels after the site applies for and obtains a PRE token.

502. Terminals that are paired with the terminals sending the auxiliary streams that are located at one or more other sites of the conference receive respective auxiliary streams.

Specifically, assuming that a first terminal and a second terminal are located at a first site, in step 501, the first terminal at the first site sends an auxiliary stream through a first auxiliary stream channel after the first site obtains a PRE token, so that a terminal that is paired with the first terminal and is located at one or more other sites receives the auxiliary stream, where the first auxiliary stream channel is a PRE auxiliary stream channel; and the second terminal at the first site sends another auxiliary stream through a second auxiliary stream channel after the first site obtains a PRE token, so that a terminal that is paired with the second terminal and is located at one or more other sites receives the other auxiliary stream, where the second auxiliary stream channel is a PRE auxiliary stream channel, a LIVE auxiliary stream channel, or a PREAnnex auxiliary stream channel. In this embodiment and subsequent embodiments shown in FIGS. 6, 7A, and 7B, the second auxiliary stream channel follows the first auxiliary stream channel, which is different from the "follow" in the embodiments shown in FIGS. 2, 3, and 4. In this embodiment and subsequent embodiments shown in FIGS. 6, 7A, and 7B, the second auxiliary stream channel is used to send another auxiliary stream to the site to which the first auxiliary stream channel is used to send an auxiliary stream, that is, the first auxiliary stream channel and the second auxiliary stream channel are used to send multiple auxiliary streams to the same site.

A pairing relationship of terminals at different sites may be predefined, for example, if a three-screen site and a single-screen site participate in the conference, one terminal at the three-screen site is paired with a terminal at the single-screen site, and in this situation, only one auxiliary stream is sent to the single-screen site.

Optionally, the method may further include the following: After obtaining the PRE token, the first terminal sends a notification message to the second terminal, where the notification message indicates using an auxiliary stream channel to send an auxiliary stream. In step 502, after receiving the notification message, the second terminal sends another auxiliary stream through the second auxiliary stream channel.

Or, after applying for and obtaining a PRE token, each terminal of the multiple terminals at the same site sends an auxiliary stream through its respective auxiliary stream channel, where the PRE token that is applied for and obtained by each terminal is a PRE token applicable to the terminal and a terminal that is paired with the terminal and is located at one or more other sites, and the one or more other sites refer to the sites other than the site where the terminals are located. Specifically, after applying for and obtaining a first PRE token, the first terminal sends an auxiliary stream through the first auxiliary stream channel, where the first PRE token is a PRE token applicable to the first terminal and a terminal that is paired with the first terminal and is located at one or more other sites; and after applying for and obtaining a second PRE token, the second terminal sends another auxiliary stream through the second auxiliary stream channel, where the second PRE token is a PRE token applicable to the second terminal and a terminal that is paired with the second terminal and is located at one or more other sites.

In order to apply for and obtain a PRE token, the method further includes the following: Each terminal of multiple terminals apply for a PRE token from a conferencing server; after determining that each terminal applying for the PRE token belong to a same site, the conferencing server sends the PRE token applicable to its corresponding terminal and a terminal that is paired with the terminal and is located at one or more other sites to the terminal applying for the PRE token.

In this embodiment of the present invention, after the local site obtains the PRE token, the multiple terminals at the same site send the auxiliary streams, so that the terminals that are paired with the terminals sending the auxiliary streams and are located at one or more other sites receive respective auxiliary streams, and that participants at one or more other sites can view the images of multiple auxiliary streams.

The embodiment shown in FIG. 5 is described in detail in the following two embodiments.

Figure 6:
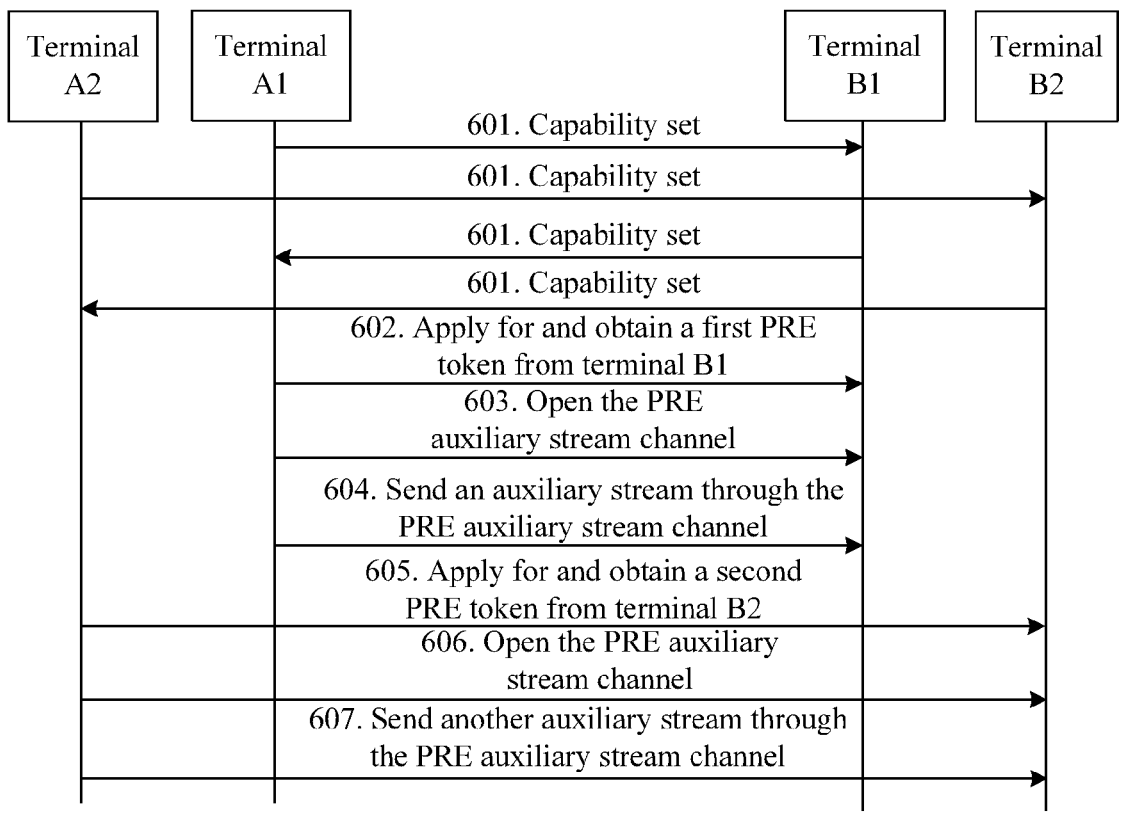
FIG. 6 is a flow chart of a method for sending multiple auxiliary streams by multiple terminals according to an embodiment of the present invention.

FIG. 6 shows a method for controlling multiple auxiliary streams according to an embodiment of the present invention, where the method is applicable to a point-to-point conference. At a site including multiple terminals, each terminal at the site is paired with a corresponding terminal at the peer site; calls of different pairs of terminals are independent; and PRE tokens are also independent. Therefore, different terminals at a same site each apply for a PRE token from corresponding terminals at the peer site without affecting each other, and open their respective auxiliary stream channels after obtaining a PRE token. The method specifically includes the following:

601. A terminal at site A sends a capability set of the terminal at site A to a terminal that is paired with the terminal at site A and is located at site B; and the terminal at site B sends a capability set of the terminal at site B to the terminal that is paired with the terminal at site B and is located at site A.

In this embodiment, it is assumed that terminal A1 at site A is paired with terminal B1 at site B, and that terminal A2 at site A is paired with terminal B2 at site B.

602. Terminal A1 at site A applies for and obtains a first PRE token from terminal B1 at site B.

603. Terminal A1 opens the PRE auxiliary stream channel between terminal A1 and terminal B1 when determining, according to the capability set of terminal B1 and the capability set of terminal A1, that both terminal A1 and terminal B1 can use the PRE auxiliary stream channel.

604. Terminal A1 sends an auxiliary stream to terminal B1 through the opened auxiliary stream channel.

605. Terminal A2 at site A applies for and obtains a second PRE token from terminal B2 at site B.

606. Terminal A2 opens the PRE auxiliary stream channel between terminal A2 and terminal B2 when determining, according to the capability set of terminal B2 and the capability set of terminal A2, that both terminal B2 and terminal A2 can use the PRE auxiliary stream channel.

607. Terminal A2 sends another auxiliary stream to terminal B2 through the opened auxiliary stream channel.

Subsequently, if terminal A1 does not need to send an auxiliary stream, the PRE token obtained by terminal A1 may be released; and if terminal A2 does not need to send an auxiliary stream, the PRE token obtained by terminal A2 may be released.

The above embodiment is described by using an example of a point-to-point conference. In a scenario of a multipoint conference, each terminal directly exchanges the capability sets with a conferencing server. Terminal A1 applies for a token, and terminal A2 applies for a token. The conferencing server determines whether the terminals applying for the tokens belong to a same site, and if yes, agrees to grant terminal A1 the first PRE token, and grant terminal A2 the second PRE token. In this way, terminal A1 opens the PRE auxiliary stream channel between terminal A1 and the conferencing server after obtaining the first PRE token, and after determining a terminal supporting the PRE auxiliary stream channel and paired with terminal A1 according to capability sets of terminals at one or more other sites, the conferencing server opens the PRE auxiliary stream channel between the conferencing server and the determined terminal that is paired with terminal A1 and that supports the PRE auxiliary stream channel, and subsequently sends an auxiliary stream that is received from terminal A1 to a corresponding terminal at one or more other sites (that is, a terminal supporting the PRE auxiliary stream channel and paired with terminal A1); terminal A2 opens the PRE auxiliary stream channel between terminal A2 and the conferencing server after obtaining the second PRE token; and after determining, according to the capability sets of terminals at one or more other sites, a terminal supporting the PRE auxiliary stream channel and paired with terminal A2, the conferencing server opens the PRE auxiliary stream channel between the conferencing server and the determined terminal paired with terminal A2 and supporting the PRE auxiliary stream channel, and subsequently sends an auxiliary stream that is received from terminal A2 to a corresponding terminal at one or more other sites (that is, a terminal supporting the PRE auxiliary stream channel and paired with terminal A2).

In this embodiment of the present invention, each terminal at the site is paired with a corresponding terminal at the peer site; calls of different pairs of terminals are independent; and PRE tokens are also independent. After obtaining a PRE token applied from corresponding terminals at the peer conference, different terminals at the same site open their respective auxiliary stream channels to transmit the auxiliary streams, so that participants at one or more other sites can view images of multiple auxiliary streams.

Figure 7A:
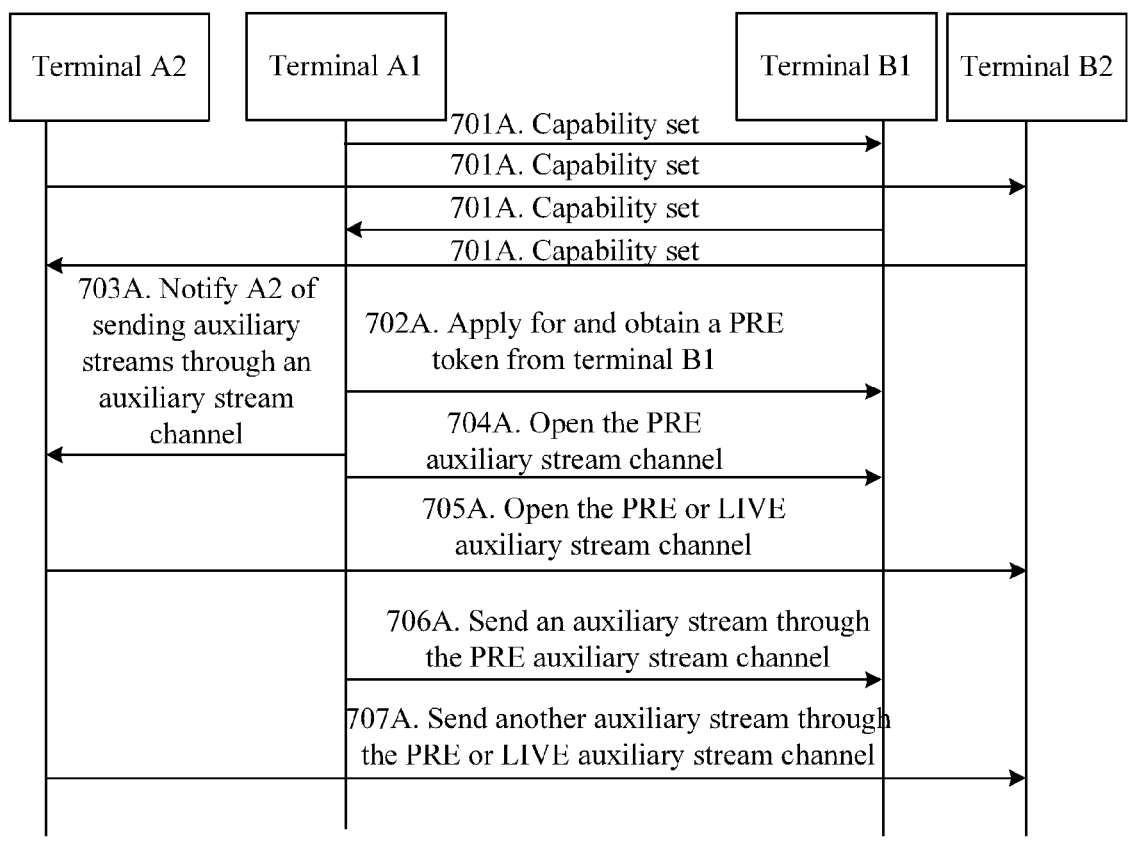
FIG. 7A is a flow chart of another method for sending multiple auxiliary streams by multiple terminals according to an embodiment of the present invention.

FIG. 7A shows a method for controlling multiple auxiliary streams according to an embodiment of the present invention. In this method, a terminal of a multi-screen site obtains a PRE token, and controls multiple terminals at the site to send multiple auxiliary streams. The method specifically includes the following:

701. A terminal at site A sends a capability set of the terminal at site A to a terminal that is paired with the terminal at site A and is located at site B; and the terminal at site B sends a capability set of the terminal at site B to the terminal that is paired with the terminal at site B and is located at site A.

In this embodiment, it is assumed that terminal A1 at site A is paired with terminal B1 at site B, and that terminal A2 at site A is paired with terminal B2 at site B.

702A. Terminal A1 at site A applies for and obtains a PRE token from terminal B1 at site B.

703A. Terminal A1 sends a notification message to terminal A2, where the notification message is used to instruct terminal A2 to send an auxiliary stream through an auxiliary stream channel.

704A. Terminal A1 opens the PRE auxiliary stream channel between terminal A1 and terminal B1 when determining, according to the capability set of terminal B1 and the capability set of terminal A1, that both terminal B1 and terminal A1 support the PRE auxiliary stream channel.

705A. After receiving the notification message sent by terminal A1, terminal A2 opens the PRE auxiliary stream channel or LIVE auxiliary stream channel between terminal A2 and terminal B2 when determining, according to the capability set of terminal B2 and the capability set of terminal A2, that both terminal B2 and terminal A2 support the PRE auxiliary stream channel or the LIVE auxiliary stream channel.

706A. Terminal A1 sends an auxiliary stream to terminal B1 through an opened auxiliary stream channel.

707A. Terminal A2 sends another auxiliary stream to terminal B2 through the opened auxiliary stream channel.

It should be noted that the sequence of steps 703A and 704A and the sequence of steps 706A and 707A are not limited.

The above embodiment is described by using an example of a point-to-point conference. In a scenario of a multipoint conference, each terminal directly exchanges the capability sets with the conferencing server. After terminal A1 obtains the PRE token, terminal A1 requests to open a PRE auxiliary stream channel between terminal A1 and the conferencing server, and terminal A2 requests to open a PRE auxiliary stream channel or LIVE auxiliary stream channel between terminal A2 and the conferencing server. The conferencing server determines whether the terminals requesting to open the auxiliary stream channels belong to a same site, and if yes, allows terminal A1 and terminal A2 to open the corresponding auxiliary stream channels. After determining a terminal supporting the PRE auxiliary stream channel and paired with terminal A1 according to capability sets of terminals at one or more other sites, the conferencing server opens the PRE auxiliary stream channel between the conferencing server and the determined terminal paired with terminal A1 and supporting the PRE auxiliary stream channel, and subsequently sends an auxiliary stream that is received from terminal A1 to a corresponding terminal at one or more other sites (that is, a terminal supporting the PRE auxiliary stream channel and paired with terminal A1); and after determining, according to the capability sets of terminals at one or more other sites, a terminal supporting the PRE auxiliary stream channel or a LIVE auxiliary stream channel and paired with terminal A2, the conferencing server opens the PRE auxiliary stream channel or LIVE auxiliary stream channel between the conferencing server and the determined terminal paired with terminal A2, and subsequently sends an auxiliary stream that is received from terminal A2 to a corresponding terminal at one or more other sites (that is, a terminal supporting the PRE auxiliary stream channel and paired with terminal A2).

It should be noted that, the terminal obtaining the PRE token at site A may be considered as a main terminal at site A. The main terminal at the site in this embodiment refers to a terminal capable of notifying other terminals (such as terminal A2) to send an auxiliary stream through the auxiliary stream channel. Optionally, in a scenario of a multipoint conference, whether terminal A2 is allowed to open the auxiliary stream channel may be determined by the conferencing server in advance when terminal A2 exchanges the capability sets with the conferencing server, that is, when terminal A2 exchanges the capability sets with the conferencing server, the capability set sent by the conferencing server to the terminal does not carry an auxiliary stream channel type, so that terminal A2 will not open the auxiliary stream channel.

In this embodiment of the present invention, after applying for and obtaining the PRE token, terminal A1 opens the auxiliary stream channel of terminal A1, and notifies terminal A2 of opening the auxiliary stream channel to transmit an auxiliary stream. In this way, both terminal A1 and terminal A2 located at the same site can send auxiliary streams, so that a terminal that is paired with terminal A1 and is located at one or more other sites can receive the auxiliary stream sent by terminal A1, and that a terminal that is paired with terminal A2 and is located at one or more other sites can receive the auxiliary stream sent by terminal A2. Thereby, participants at one or more other sites can view images of multiple auxiliary streams.

Figure 7B:
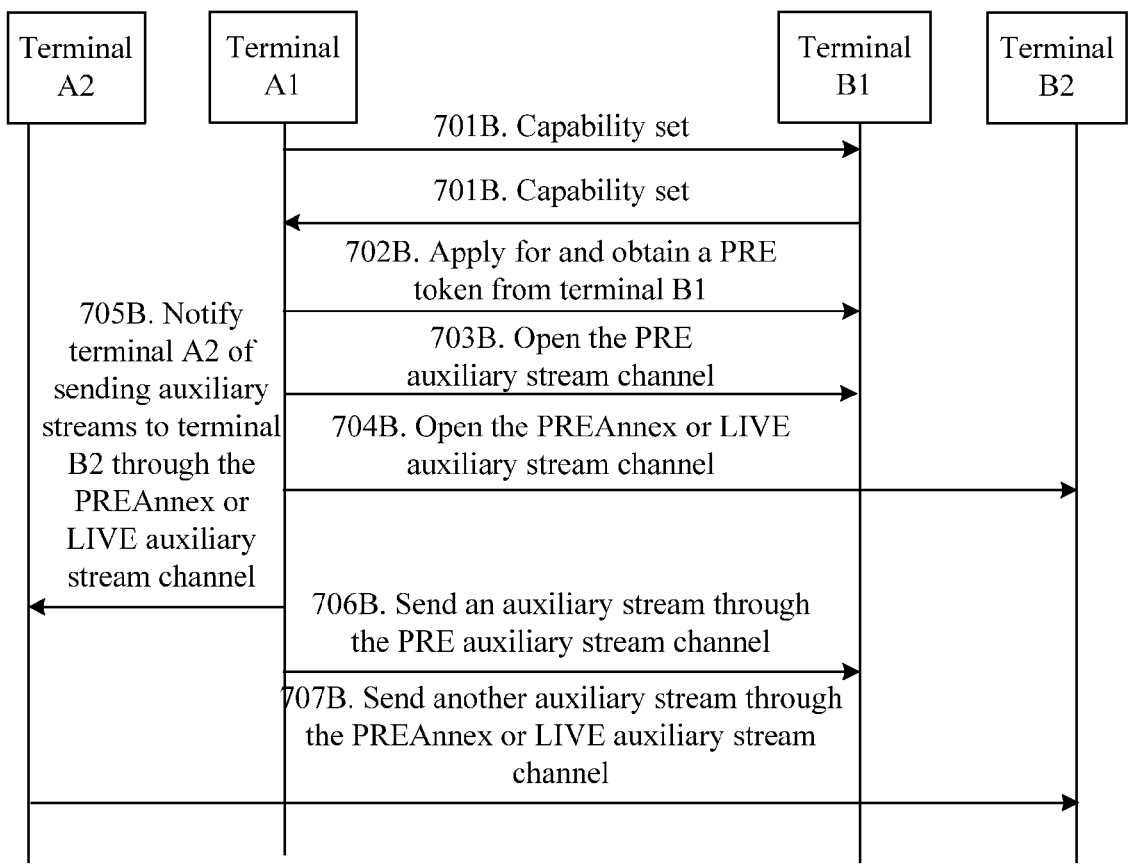
FIG. 7B is a flow chart of another method for sending multiple auxiliary streams by multiple terminals according to an embodiment of the present invention.

FIG. 7B shows another method for controlling multiple auxiliary streams according to an embodiment of the present invention, where the difference from the embodiment shown in FIG. 7A mainly lies in that: A main terminal at a local site and a main terminal at the peer site exchange capability sets (the capability sets in this embodiment carry capabilities of multiple terminals at the sites), and multiple terminals at the local site send auxiliary streams to multiple terminals at the peer site. The method specifically includes the following:

701B. Terminal A1 at site A sends a capability set of site A to terminal B1 at site B; and terminal B1 at site B sends a capability set of site B to terminal A1 at site A.

In this embodiment of the present invention, terminal A1 is bound with terminal A2, and it is assumed that terminal A1 acts as the main terminal at site A; and terminal B1 is bound with terminal B2, and it is assumed that terminal B1 acts as the main terminal at site B. The main terminal at the site in this embodiment refers to a terminal representing the local site to perform capability negotiation with one or more other sites in the conference and capable of opening multiple auxiliary stream channels, and the main terminal knows auxiliary stream channel types supported by each terminal at the local site.

The capability set of the site in this step indicates which auxiliary stream channel types the site supports, for example, a PRE auxiliary stream channel, a LIVE auxiliary stream channel, and/or a PREAnnex auxiliary stream channel.

702B. Terminal A1 at site A applies for and obtains a PRE token from terminal B1 at site B.

703B. Terminal A1 opens the PRE auxiliary stream channel when terminal A1 at site A determines, according to capabilities of terminal A1 and terminal B1, that both terminal A1 and terminal B1 support the PRE auxiliary stream channel.

704B. When determining, according to the auxiliary stream channel type supported by terminal A2 and the capability set of site B, that terminal A2 and the terminal at site B support the PREAnnex auxiliary stream channel or that terminal A2 and the terminal at site B support the LIVE auxiliary stream channel, terminal A1 at site A opens the determined auxiliary stream channel supported by terminal A2 and the terminal at site B, that is, the PREAnnex auxiliary stream channel or the LIVE auxiliary stream channel.

Assuming that terminal A2 supports the LIVE auxiliary stream channel, and that the capability set of site B includes the LIVE auxiliary stream channel type, when it is required to transmit multiple auxiliary streams, terminal A1 may send a request for opening the LIVE auxiliary stream channel to terminal B1; assuming that terminal B2 supports the LIVE auxiliary stream channel, terminal B1 sends a response message to terminal A1, where a receiving address of an auxiliary stream corresponding to the LIVE auxiliary stream channel carried in the message is an address of terminal B2, to open an auxiliary stream channel between terminal A2 and terminal B2.

705B. Terminal A1 at site A sends a notification message to terminal A2, to notify terminal A2 of sending another auxiliary stream to terminal B2 through the opened PREAnnex auxiliary stream channel or LIVE auxiliary stream channel.

706B. Terminal A1 at site A sends an auxiliary stream to terminal B1 at site B.

707B. Terminal A2 at site A sends another auxiliary stream to terminal B2 at site B.

This embodiment is described by using an example of a point-to-point conference. In a scenario of a multipoint conference, each terminal directly exchanges the capability sets with the conferencing server. After applying for and obtaining the PRE token, terminal A1 opens the above two auxiliary stream channels, and terminal A1 and terminal A2 each sends an auxiliary stream. After receiving an auxiliary stream sent by terminal A1, the conferencing server sends the auxiliary stream to a terminal that is paired with terminal A1 and is located at one or more other sites through a corresponding auxiliary stream channel; after receiving an auxiliary stream sent by terminal A2, the conferencing server sends the auxiliary stream to a terminal that is paired with terminal A2 and is located at the one or more other sites through a corresponding auxiliary stream channel.

In this embodiment of the present invention, after applying for and obtaining the PRE token, terminal A1 opens multiple auxiliary stream channels, and notifies terminal A2 of transmitting an auxiliary stream. In this way, both terminal A1 and terminal A2 located at the same site can send auxiliary streams, so that a terminal that is paired with terminal A1 and is located at one or more other sites can receive the auxiliary stream sent by terminal A1, and that a terminal that is paired with terminal A2 and is located at one or more other sites can receive the auxiliary stream sent by terminal A2. Thereby, participants at one or more other sites can view images of multiple auxiliary streams.

The above embodiments are described by using H.323 as an example. The technical solutions provided in the embodiments of the present invention are also applicable to the Session Initiation Protocol (SIP), and a difference from the H.323 protocol lies in that: When the SIP is used, terminals at different sites may not transmit their capability sets to each other, that is, no independent capability set transmission process exists, and when the SIP is used, a corresponding auxiliary stream channel may be requested to be opened during a call process initiated by a terminal, and a call message sent by using the SIP specifically includes the following content:

v=0
o=Alice 292742730 29277831 IN IP4 131.163.72.4
s=Second lecture from information technology
c=IN IP4 131.164.74.2
t=0 0
m=video 52886 RTP/AVP 31 (Definition of auxiliary stream channel 1)
  a=rtpmap:31 H261/9000
  a=contentslides (Role definition of auxiliary stream channel 1)
m=video 53334 RTP/AVP 31 (Definition of auxiliary stream channel 2)
  a=rtpmap:31 H261/9000
  a=content:PREAnnex (Role definition of auxiliary stream channel 2)
m=video 54132 RTP/AVP 31 (Definition of a main stream channel)
  a=rtpmap:31 H261/9000
  a=content:main (Type definition of a main stream channel)

where a=content:slides indicates that a terminal can use a slides auxiliary stream channel, which is equivalent to the PRE auxiliary stream channel in the H.323 protocol, and a=content:PREAnnex indicates that the terminal can use the PREAnnex auxiliary stream channel. The call message sent by using the SIP may also include an alt auxiliary stream channel, which is equivalent to the LIVE auxiliary stream channel in H.239.

Figure 8:
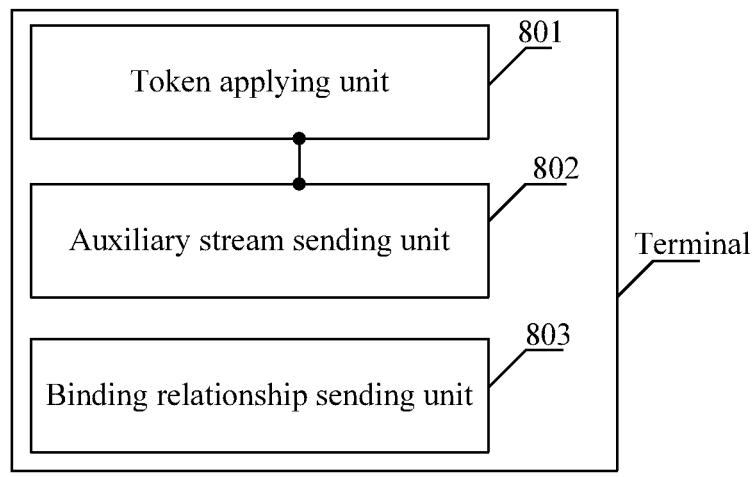
FIG. 8 is a structural diagram of a terminal according to an embodiment of the present invention.

Referring to FIG. 8, this embodiment of the present invention provides a terminal, located at a first site, and the terminal mainly includes: a token applying unit 801 configured to apply for a PRE token; and an auxiliary stream sending unit 802 configured to send, after applying for and obtaining the PRE token, an auxiliary stream to a terminal at a second site through a PRE auxiliary stream channel corresponding to the PRE token, and send one or more other auxiliary streams to the terminal at the second site through an auxiliary stream channel bound with the PRE auxiliary stream channel.

The terminal is a terminal at the first site; and the auxiliary stream channel bound with the PRE auxiliary stream channel is: an extended PREAnnex auxiliary stream channel or a LIVE auxiliary stream channel. Specifically, the auxiliary stream sending unit 802 is specifically configured to directly send, in a point-to-point conference, an auxiliary stream to the terminal at the second site through the PRE auxiliary stream channel corresponding to the PRE token, and directly send one or more other auxiliary streams to the terminal at the second site through the auxiliary stream channel bound with the PRE auxiliary stream channel; or, the auxiliary stream sending unit is specifically configured to send, in a multipoint conference, an auxiliary stream to a conferencing server through the PRE auxiliary stream channel corresponding to the PRE token, and send one or more other auxiliary streams to the conferencing server through the auxiliary stream channel bound with the PRE auxiliary stream channel, so that the conferencing server sends the auxiliary stream and one or more other auxiliary streams to a terminal at a site other than the first site in the conference.

The auxiliary stream sending unit 802 is specifically configured to: after applying for and obtaining the PRE token and when both the terminal at the first site and the terminal at the second site support the PRE auxiliary stream channel and the auxiliary stream channel bound with the PRE auxiliary stream channel, send an auxiliary stream to the terminal at the second site through the PRE auxiliary stream channel, and send one or more other auxiliary streams to the terminal at the second site through the auxiliary stream channel bound with the PRE auxiliary stream channel; or, when both the terminal at the first site and the terminal at the second site support the PRE auxiliary stream channel, determine, according to a predetermined rule, that the terminal at the first site and the terminal at the second site also support the PREAnnex auxiliary stream channel bound with the PRE auxiliary stream channel, send an auxiliary stream to the terminal at the second site through the PRE auxiliary stream channel, and send one or more other auxiliary streams to the terminal at the second site through the PREAnnex auxiliary stream channel bound with the PRE auxiliary stream channel.

Optionally, in order to notify the peer of which LIVE auxiliary stream channel to be used, the terminal further includes: a binding relationship sending unit 803 configured to send binding relationship indication information to the terminal at the second site, where the binding relationship indication information indicates the LIVE auxiliary stream channel bound with the PRE auxiliary stream channel; or send the binding relationship indication information to the conferencing server, where the binding relationship indication information indicates the LIVE auxiliary stream channel bound with the PRE auxiliary stream channel, so that the conferencing server notifies terminals of a terminal at a site other than the first site in a conference of the LIVE auxiliary stream channel bound with the PRE auxiliary stream channel.

In this embodiment of the present invention, after applying for and obtaining the PRE token, the terminal may send multiple auxiliary streams through the PRE auxiliary stream channel corresponding to the PRE token and the PREAnnex or LIVE auxiliary stream channel bound with the PRE auxiliary stream channel, so that participants receiving the multiple auxiliary streams at the sites can view the images of multiple auxiliary streams simultaneously.

Figure 9:
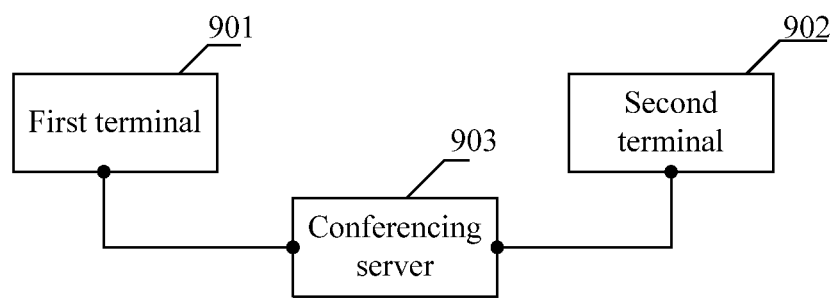
FIG. 9 is a structural diagram of a network according to an embodiment of the present invention.

Referring to FIG. 9, an embodiment of the present invention provides a network system, including: a first terminal 901 and a second terminal 902, where the first terminal and the second terminal are located at a first site, where: the first terminal is configured to send an auxiliary stream through a first auxiliary stream channel after the first site applies for and obtains a PRE token, so that a terminal paired with the first terminal and is located at a second site receives the auxiliary stream; and the second terminal is configured to send another auxiliary stream through a second auxiliary stream channel after the first site applies for and obtains the PRE token, so that a terminal that is paired with the second terminal and is located at the second site receives the other auxiliary stream.

In a specific implementation, the first terminal is further configured to send a notification message to the second terminal after applying for and obtaining the PRE token, where the notification message indicates using an auxiliary stream channel to send an auxiliary stream; and the second terminal is further configured to send another auxiliary stream through the second auxiliary stream channel after receiving the notification message.

In this way, the first terminal notifies the second terminal of opening the auxiliary stream channel to transmit an auxiliary stream. Hence, both the first terminal and the second terminal located at the same site can send auxiliary streams, a terminal that is paired with the first terminal and is located at one or more other sites can receive the auxiliary stream sent by the first terminal, and a terminal that is paired with the second terminal and is located at one or more other sites can receive the auxiliary stream sent by the second terminal. Thereby, participants at one or more other sites can view images of multiple auxiliary streams.

In another specific implementation, the first terminal is specifically configured to send an auxiliary stream through the first auxiliary stream channel after applying for and obtaining a first PRE token, where the first PRE token is a PRE token applicable to the first terminal and a terminal that is paired with the first terminal and is located at one or more other sites; and the second terminal is specifically configured to send another auxiliary stream through the second auxiliary stream channel after applying for and obtaining a second PRE token, where the second PRE token is a PRE token applicable to the second terminal and a terminal that is paired with the second terminal and is located at one or more other sites. At this time, optionally, the network system further includes: a conferencing server 903 configured to determine whether the terminals applying for the PRE tokens belong to a same site, and if yes, agree to grant the first terminal the first PRE token, and the second terminal the second PRE token.

In this way, the first terminal applies for and obtains the first PRE token, and sends an auxiliary stream through the PRE auxiliary stream channel, so that a terminal that is paired with the first terminal and is located at one or more other sites receive the auxiliary stream; and the second terminal applies for and obtains the second PRE token, and sends an auxiliary stream through the PRE auxiliary stream channel, so that a terminal that is paired with the second terminal and is located at one or more other sites receives the auxiliary stream, and that participants at one or more other sites can view images of multiple auxiliary streams.

Persons of ordinary skill in the art may understand that all or part of the steps of the method provided in the embodiments may be implemented by a program instructing relevant hardware. The program may be stored in a computer readable storage medium, such as, a read-only memory, a magnetic disk, or an optical disk.

A method, device, and network system for controlling multiple auxiliary streams according to the embodiments of the present invention are described in detail above. Specific embodiments are used herein to describe the principle and implementation of the present invention. The description of the above embodiments is merely used to help understand the methods and core idea of the present invention. Meanwhile, persons of ordinary skill in the art may make modifications with respect to the specific implementation and applicability on the basis of the idea of the present invention. Based on the above, the content of the specification shall not be understood as a limitation on the present invention.

What is claimed is:

1. A method for controlling multiple auxiliary streams, comprising:
    applying, by a terminal at a first site, for a presentation (PRE) token; and
    sending, by the terminal at the first site, after applying for and obtaining the PRE token, an auxiliary stream to a terminal at a second site through a PRE auxiliary stream channel corresponding to the PRE token, and sending one or more other auxiliary streams to the terminal at the second site through an auxiliary stream channel bound with the PRE auxiliary stream channel.

2. The method according to claim 1, wherein sending, by the terminal at the first site, the auxiliary stream to the terminal at the second site through the PRE auxiliary stream channel corresponding to the PRE token, and sending the one or more other auxiliary streams to the terminal at the second site through the auxiliary stream channel bound with the PRE auxiliary stream channel comprise:
    when both the terminal at the first site and the terminal at the second site support the PRE auxiliary stream channel and an auxiliary content PREAnnex auxiliary stream channel bound with the PRE auxiliary stream channel, sending the auxiliary stream to the terminal at the second site through the PRE auxiliary stream channel, and sending the one or more other auxiliary streams to the terminal at the second site through the PREAnnex auxiliary stream channel bound with the PRE auxiliary stream channel; or
    when both the terminal at the first site and the terminal at the second site support the PRE auxiliary stream channel and a LIVE auxiliary stream channel bound with the PRE auxiliary stream channel, sending an auxiliary stream to the terminal at the second site through the PRE auxiliary stream channel, and sending one or more other auxiliary streams to the terminal at the second site through the LIVE auxiliary stream channel bound with the PRE auxiliary stream channel.

3. The method according to claim 1, wherein the auxiliary stream channel bound with the PRE auxiliary stream channel comprises an extended auxiliary content PREAnnex auxiliary stream channel or a LIVE auxiliary stream channel.

4. The method according to claim 3, wherein sending, by the terminal at the first site, the auxiliary stream to the terminal at the second site through the PRE auxiliary stream channel corresponding to the PRE token, and sending the one or more other auxiliary streams to the terminal at the second site through the auxiliary stream channel bound with the PRE auxiliary stream channel comprise when both the terminal at the first site and the terminal at the second site support the PRE auxiliary stream channel, determining, according to a predetermined rule, that the terminal at the first site and the terminal at the second site also support a PREAnnex auxiliary stream channel bound with the PRE auxiliary stream channel, sending an auxiliary stream to the terminal at the second site through the PRE auxiliary stream channel, and sending one or more other auxiliary streams to the terminal at the second site through the PREAnnex auxiliary stream channel bound with the PRE auxiliary stream channel, wherein the predetermined rule specifies that a terminal supporting the PRE auxiliary stream channel also supports the PREAnnex auxiliary stream channel.

5. The method according to claim 1, wherein sending, by the terminal at the first site, the auxiliary stream to the terminal at the second site through the PRE auxiliary stream channel corresponding to the PRE token, and sending the one or more other auxiliary streams to the terminal at the second site through the auxiliary stream channel bound with the PRE auxiliary stream channel specifically comprise:
  in a point-to-point conference, directly sending, by the terminal at the first site, an auxiliary stream to the terminal at the second site through the PRE auxiliary stream channel corresponding to the PRE token, and directly sending one or more other auxiliary streams to the terminal at the second site through the auxiliary stream channel bound with the PRE auxiliary stream channel; or
  in a multipoint conference, sending, by the terminal at the first site, an auxiliary stream to a conferencing server through the PRE auxiliary stream channel corresponding to the PRE token, and sending one or more other auxiliary streams to the conferencing server through the auxiliary stream channel bound with the PRE auxiliary stream channel such that the conferencing server sends the auxiliary stream and the one or more other auxiliary streams to a terminal at a site other than the first site in the conference.

6. The method according to claim 1, wherein before sending the one or more other auxiliary streams to the terminal at the second site through the auxiliary stream channel bound with the PRE auxiliary stream channel, the method further comprises:
  sending binding relationship indication information to the terminal at the second site, wherein the binding relationship indication information indicates a LIVE auxiliary stream channel bound with the PRE auxiliary stream channel; or
  sending binding relationship indication information to a conferencing server, wherein the binding relationship indication information indicates a LIVE auxiliary stream channel bound with the PRE auxiliary stream channel such that the conferencing server sends multiple auxiliary streams to a terminal at a site other than the first site in a conference through the PRE auxiliary stream channel and the LIVE auxiliary stream channel bound with the PRE auxiliary stream channel after receiving multiple auxiliary streams sent by the terminal at the first site.

7. A method for controlling multiple auxiliary streams, comprising:
  sending, by multiple terminals at a same site, auxiliary streams through their respective auxiliary stream channels after the site applies for and obtains a presentation (PRE) token such that terminals that are paired with the terminals sending the auxiliary streams and are located at one or more other sites of a conference receive their respective auxiliary streams,
  wherein sending, by the multiple terminals at the same site, the auxiliary streams through their respective auxiliary stream channels after the site applies for and obtains the PRE token comprises after applying for and obtaining the PRE token, sending, by each terminal of the multiple terminals at the same site, an auxiliary stream through its respective auxiliary stream channel, wherein the PRE token that is applied for and obtained by each terminal is a PRE token applicable to the terminal and a terminal that is paired with the terminal and is located at one or more other sites of the conference.

8. The method according to claim 7, further comprising:
  applying, by each terminal of the multiple terminals, for the PRE token from a conferencing server; and
  after determining that each terminal of the multiple terminals applying for the PRE token belongs to a same site, sending, by the conferencing server to the terminal applying for the PRE token, the PRE token that is applicable to its corresponding terminal and a terminal that is paired with the terminal and is located at one or more other sites.

9. A terminal, located at a first site, comprising:
  a token applying unit configured to apply for a presentation (PRE) token; and
  an auxiliary stream sending unit configured to send, after applying for and obtaining the PRE token, an auxiliary stream to a terminal at a second site through a PRE auxiliary stream channel corresponding to the PRE token, and send one or more other auxiliary streams to the terminal at the second site through an auxiliary stream channel bound with the PRE auxiliary stream channel.

10. The terminal according to claim 9, wherein the auxiliary stream channel bound with the PRE auxiliary stream channel comprises an extended PREAnnex auxiliary stream channel or a LIVE auxiliary stream channel.

11. The terminal according to claim 10, further comprising a binding relationship sending unit configured to:
  send binding relationship indication information to the terminal at the second site, wherein the binding relationship indication information indicates the LIVE auxiliary stream channel bound with the PRE auxiliary stream channel; or
  send binding relationship indication information to a conferencing server, wherein the binding relationship indication information indicates the LIVE auxiliary stream channel bound with the PRE auxiliary stream channel such that the conferencing server sends multiple auxiliary streams to a terminal at a site other than the first site in a conference through the PRE auxiliary stream channel and the LIVE auxiliary stream channel bound with the PRE auxiliary stream channel after receiving multiple auxiliary streams sent by the terminal at the first site.

12. The terminal according to claim 9, wherein the auxiliary stream sending unit is specifically configured to directly send, in a point-to-point conference, an auxiliary stream to the terminal at the second site through the PRE auxiliary stream channel corresponding to the PRE token, and directly send one or more other auxiliary streams to the terminal at the second site through the auxiliary stream channel bound with the PRE auxiliary stream channel, or wherein the auxiliary stream sending unit is specifically configured to send, in a multipoint conference, an auxiliary stream to a conferencing server through the PRE auxiliary stream channel corresponding to the PRE token, and send one or more other auxiliary streams to the conferencing server through the auxiliary stream channel bound with the PRE auxiliary stream channel such that the conferencing server sends the auxiliary stream and the one or more other auxiliary streams to a terminal at a site other than the first site in the conference.

13. A network system, comprising:
   a first terminal; and
   a second terminal,
   wherein the first terminal and the second terminal are located at a first site,
   wherein the first terminal is configured to send an auxiliary stream through a first auxiliary stream channel after the first site applies for and obtains a first presentation (PRE) token, wherein the first PRE token is a PRE token applicable to the first terminal and a terminal that is paired with the first terminal and is located at a site other than the first site in a conference such that a terminal paired with the first terminal and is located at a second site receives the auxiliary stream, and
   wherein the second terminal is configured to send another auxiliary stream through a second auxiliary stream channel after the second terminal applies for and obtains a second PRE token, wherein the second PRE token is a PRE token applicable to the second terminal and a terminal that is paired with the second terminal and is located at a site other than the first site in the conference such that a terminal paired with the second terminal and is located at the second site receives the other auxiliary stream.

14. The network system according to claim 13, further comprising a conferencing server configured to determine whether the terminals applying for the PRE tokens belong to a same site, and if yes, agree to grant the first terminal the first PRE token, and the second terminal the second PRE token.

\* \* \* \* \*

UNITED STATES PATENT AND TRADEMARK OFFICE
CERTIFICATE OF CORRECTION

PATENT NO. : 9,013,537 B2
APPLICATION NO. : 13/910341
DATED : April 21, 2015
INVENTOR(S) : Jiaoli Wu and Shuzhao Liao It is certified that error appears in the above-identified patent and that said Letters Patent is hereby corrected as shown below:

On the Title Page, Item (54) and in the Specification, Column 1, Lines 1-3, Title:

Delete "Method, Device, and Network Systems for Controlling Multiple Auxiliary Streams" and insert
-- Method, Device and Network System for Controlling Multiple Auxiliary Streams --

Signed and Sealed this
Twenty-seventh Day of October, 2015

Michelle K. Lee
*Director of the United States Patent and Trademark Office*